United States Patent [19]
Takatsuki et al.

[11] Patent Number: 5,541,639
[45] Date of Patent: Jul. 30, 1996

[54] VIDEO CONFERENCE SYSTEM AUTOMATICALLY STARTED AT RESERVED TIME

[75] Inventors: Hiroaki Takatsuki, Tokyo; Toru Komatsu, Kokubunji; Tatsuya Konishi, Kodaira; Takeshi Hoshino; Seiji Toyoda, both of Kokubunji; Yoji Shibata, Yokosuka; Satoshi Endo, Fujisawa; Iwao Ishinabe, Koganei; Kiyoshi Ishida, Yokohama, all of Japan

[73] Assignee: Hitachi, Ltd., Tokyo, Japan

[21] Appl. No.: 139,701

[22] Filed: Oct. 22, 1993

[30] Foreign Application Priority Data

Oct. 23, 1992  [JP]  Japan ................... 4-286463

[51] Int. Cl.⁶ ............... H04N 7/14; H04N 7/01; H04N 5/445
[52] U.S. Cl. ............. 348/15; 348/14; 348/445; 348/564; 348/913
[58] Field of Search .................. 379/53, 54, 202; 348/13, 14, 15, 445, 913, 564; H04N 7/14

[56] References Cited

U.S. PATENT DOCUMENTS

| | | | |
|---|---|---|---|
| 4,650,929 | 3/1987 | Boerger et al. | 348/15 |
| 4,965,819 | 10/1990 | Kannes | 348/15 |
| 5,243,421 | 9/1993 | Nagata et al. | 348/445 |
| 5,255,098 | 10/1993 | Poivet et al. | 348/445 |
| 5,313,303 | 5/1994 | Ersoz et al. | 348/445 |
| 5,381,412 | 1/1995 | Otani | 348/14 |

FOREIGN PATENT DOCUMENTS

| | | | |
|---|---|---|---|
| 0436345 | 7/1991 | European Pat. Off. | 379/53 |
| 498649 | 8/1992 | European Pat. Off. | H04N 7/14 |
| 0027555 | 3/1981 | Japan | 379/54 |

*Primary Examiner*—Jason Chan
*Attorney, Agent, or Firm*—Evenson, McKeown, Edwards & Lenahan, P.L.L.C.

[57] ABSTRACT

A video conference system control section accepts reservation of a party with which a video conference is the to be held and a video conference date and time entered through a keying section, and stores the reservation contents in an information storage section and also sends them through a communication network transmitting-receiving section to an information center for registration. In response to the stored registration contents, the video conference system control section 109 controls a power unit and the communication network transmitting-receiving section to start up at least a part of the video conference system for calling the party with which the video conference is to be held and setting up a call between them before the video conference date and time.

1 Claim, 15 Drawing Sheets

RESERVATION OF CONFERENCE WITH B IS REGISTERED IN THE CENTER THROUGH A TERMINAL

THE CENTER INFORMS B THAT A SPECIFIES B AS THE ASSOCIATED PARTY OF VIDEO CONFERENCE

INCONVENIENT FOR THE CONFERENCE AT THE TIME OF THE DAY

THE CENTER REQUESTS A TO CHANGE THE DATE AND TIME OF THE CONFERENCE

FIG. 7

```
SCHEDULE              NAME _____

MAY 18 (MON)

1   ☐ CONFERENCE    8 : 30 ~ 10 : 30

2   ▨ VISITOR       11 : 15 ~ 12 : 00

3   ▦ GOING OUT     15 : 00 ~ NR
```

FIG. 8

```
SCHEDULE              NAME _____

MAY 18 (MON)

▦ CONFERENCE    8 : 30 ~ 10 : 30

SUBJECT : VIDEO CONFERENCE SYSTEM

PLACE   : CONFERENCE ROOM 21
```

FIG. 9

```
CONFERENCE ROOM RESERVATION

SELECT THE CONFERENCE TYPE

1.  NORMAL CONFERENCE

2.  VIDEO CONFERENCE
```

FIG. 10

```
CONFERENCE ROOM
RESERVATION          : VIDEO CONFERENCE

SELECT THE ASSOCIATED PARTY

1. HEAD OFFICE
2. BRANCH A
3. BRANCH B
4.
```

FIG. 11

CONFERENCE ROOM RESERVATION: VIDEO CONFERENCE

SPECIFY DATE AND TIME OF DAY

|     |        | AM | PM |
| --- | ------ | -- | -- |
| 1.  | MAY 25 | ├──┼──┤ |
| 2.  | MAY 26 | ├──┼──┤ |
| 3.  | MAY 27 | ├──┼──┤ |
| 7.  | MAY 31 | ├──┼──┤ |

CONFERENCE ROOM RESERVATION: VIDEO CONFERENCE

ENTER START TIME OF CONFERENCE

HEAD OFFICE ←——→ BRANCH A

MAY 28

START    7         12         22

END             1 5   00 HOURS

146

CONFERENCE ROOM RESERVATION: VIDEO CONFERENCE

PRESS SETTING END

HEAD OFFICE ⟵⟶ BRANCH A

MAY 28

START    7        12        22

15 00 HOURS

END      17 00 HOURS

\# : SETTING END

147

SCREEN (16:9) — 151

VIDEO CONFERENCE SYSTEM AUTOMATICALLY STARTED AT RESERVED TIME

BACKGROUND OF THE INVENTION

1. Field of the Invention

This invention relates to a video conference system which enables a video conference, in real time with speech and video between remote places.

2. Description of the Related Art

Since a video conference is held with a plurality of video conference systems installed at places where they participate in the conference, it is preferable for reservation of use of equipment and facilities required for the video conference to be managed. In this case, formerly a system using a general purpose computer for managing reservation of use of the equipment and facilities required for the video conference was installed independently of the video conference systems.

Normally, a number of persons at one place and a number of persons at another place often join a video conference, thus the video conference system is provided with a large display having a screen with an aspect ratio of 4 to 3. The system may also be equipped with lighting apparatus for directly lighting the participants in the conference.

By the way, before the beginning of a conference, the video conference system must have been automatically started so as to receive an incoming call from the associated party at the start of the conference. However, the conventional video conference system requires that the system should be started and communication should be built up by manual operation before the scheduled start time.

To guarantee a conference schedule, preferably the schedule of the expected participants as well as the equipment and facilities required for the conference could be checked before use of the video conference system is reserved.

It is difficult for the conventional video conference system, which uses a display having a screen with an aspect ratio of 4 to 3, to properly display all participants in a conference which is often held with a number of persons at one place and a number of persons at another place.

Direct lighting of a participant would not be sufficient to enable to transmission of his or her subtle facial expressions. For this reason, special consideration such as installation of indirect lighting on the ceiling must be given to a conference room in the conventional conference system.

Normally, a camera used with a video conference is panned. At this time, something irrelevant to that part of the conference or a something which does not with to appear on TV screen may be picked up by the camera. Formerly, the facilities had to be provided with special devices such as a screen to prevent things from being inadvertently displayed on the conference screen.

SUMMARY OF THE INVENTION

Accordingly, it is an object of the invention to provide a video conference system which supports the setting of a reservation for the use thereof and can control the operation in response to the setup reservation contents.

It is another object of the invention to provide a video conference system which enables a good video conference without giving special consideration to conference rooms or facilities.

To these ends, according to one embodiment of the invention, there is provided, in a video conference system comprising a camera, a display for displaying an image on a screen, means for coding an image picked up through the camera and transmitting the resultant coded signals, means for decoding received coded video signals and displaying an image represented by the decoded video signals on the display, and an input means for accepting a user's instruction, the improvement comprising means for accepting setting of reservation of a party with which a video conference is to be held and a date and time when the video conference is to be held, entered through the input means, means for storing reservation contents of the accepted video conference, and means being responsive to the stored reservation contents for starting at least a part of the video conference system before the scheduled video conference date and time.

According to the video conference system, reservation of the party with which a video conference is to be held and the video conference date and time is accepted, and the accepted reservation contents of the video conference are stored, then according to the stored reservation contents, at least a part of the video conference system is started before the video conference date and time.

According to another embodiment of the invention, there is provided, in a video conference system comprising a camera, a display for displaying an image on a screen, a video conference unit which codes an image picked up through the camera for transmission and decodes received coded video signals and displays an image represented by the decoded video signals on the display, and a cabinet for housing the camera, the display, and the video conference unit, the improvement wherein the display is housed in the cabinet so that the bottom of the screen is placed about 70 cm above a floor when the video conference system is installed, comprising a lighting apparatus being installed in the cabinet at the rear position of the display, when the display direction of the display is assumed to be toward the front, for being capable of radiating light to the front, in a slantwise upward direction.

According to the video conference system, the lighting apparatus installed in the cabinet enables indirect lighting with ceiling reflection for appropriate lighting for video conferences without giving special consideration to conference rooms or facilities.

BRIEF DESCRIPTION OF THE DRAWINGS

In the accompanying drawings:

FIG. 7 shows a participant schedule check menu on a specific day displayed by the video conference system;

FIG. 8 shows display of detailed information on a specific entry by the video conference system;

FIG. 9 shows a conference room reservation menu displayed by the video conference system;

FIG. 10 shows an associated party selection menu displayed by the video conference system;

FIG. 11 shows a conference date specification screen displayed by the video conference system;

FIG. 12 shows a screen for setting the start time and end time of a conference displayed by the video conference system;

DESCRIPTION OF THE PREFERRED EMBODIMENTS

Referring now to the accompanying drawings, there is shown a video conference system according to one embodiment of the invention.

Figure 1:
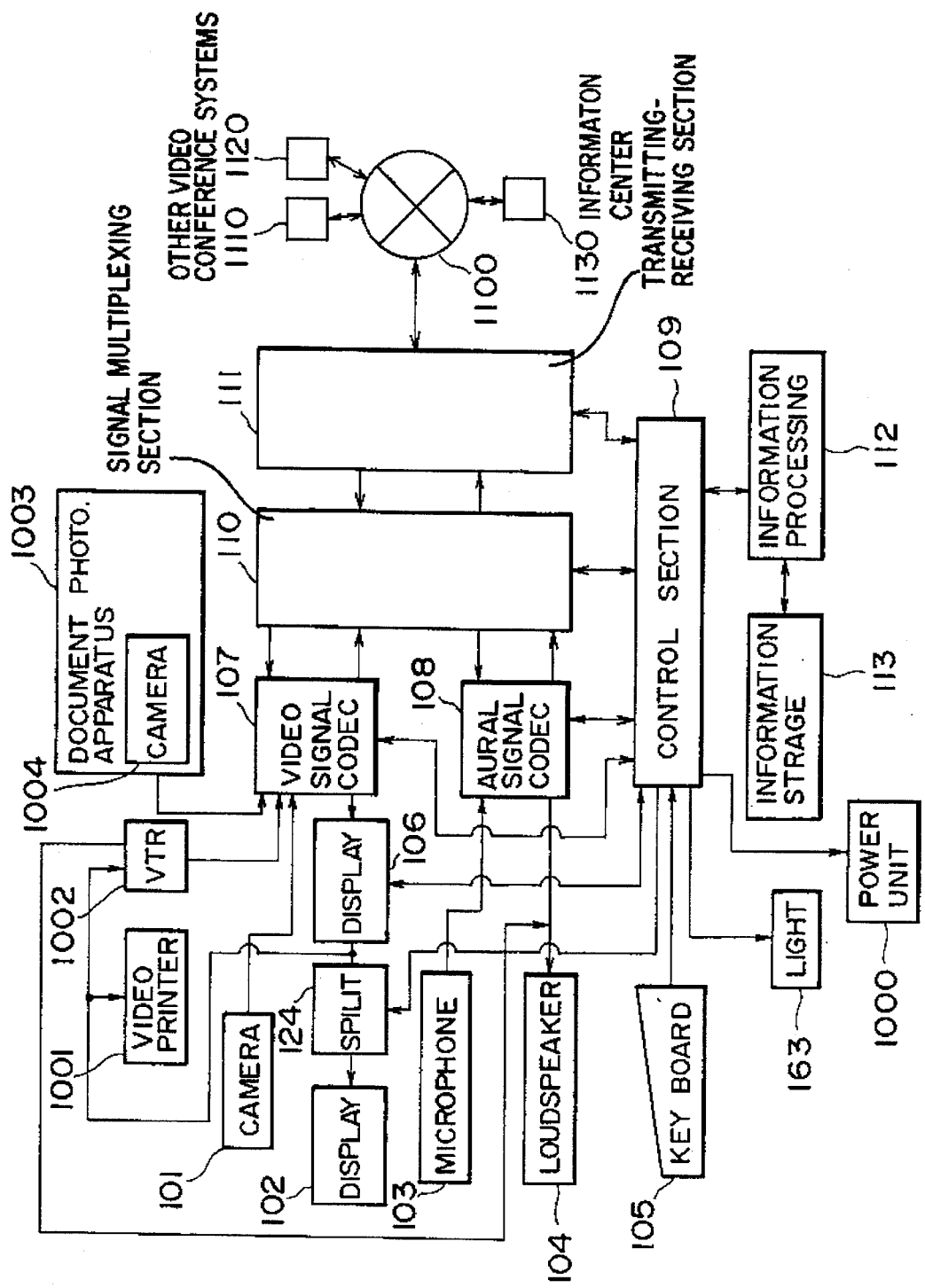
FIG. 1 is a block diagram showing the configuration of a video conference system.

FIG. 1 shows the configuration of a video conference system, wherein numeral 101 is a video input section which is assumed to be a video camera in the embodiment. Numeral 102 is an image display section which displays an image from an associated party, a monitor image of the home party, a menu image, etc., and in the embodiment, is assumed to be a display using a CRT or a projector having a screen with an aspect ratio of 16 to 9. Numeral 103 is a speech input section which inputs speech. Numeral 104 is a speech output section which outputs speech from the associated party. Numeral 105 is a keying section for handling dials and menus for communicating with the associated party. Numeral 106 is a character and graphics display section which overlays characters, graphics, etc., on an image. Numeral 107 is a video signal coding- decoding section which codes and decodes video signals. Numeral 108 is an aural signal coding-decoding section which codes and decodes aural signals. Numeral 110 is a signal multiplexing section which multiplexes the various information. Numeral 111 is a communication network transmitting-receiving section which transmits and receives the multiplexed information via a communication network 1100. Numeral 112 is an information processing section which processes information such as video and aural signals. Numeral 113 is an information storage section which stores the information. Numeral 124 is a split display processing section. Numeral 163 is a lighting apparatus. Numeral 1000 is a power unit. Numeral 1001 is a video printer. Numeral 1002 is a video tape recorder. Numeral 1003 is a document photographing apparatus. Numeral 1004 is a still camera. Numeral 109 is a video conference system control section which controls the sections of the video conference system.

Numerals 1110 and 1120 are other video conference systems and numeral 1130 is an information center; these are located on the same communication network as the video conference system.

Next, the operation of the video conference system in a video conference will be described.

First, processing of images and speeches for transmission in the home video conference system is described.

In FIG. 1, video signals from the video input section 101, character and document photographing apparatus 1003, or video tape recorder 1002 are coded by the video signal coding-decoding section 107. Some of the coded signals are decoded by the video signal coding- decoding section 107 and sent via the character and graphics display section 106 and the split display processing section 124 to the image display section 102 for display as a home image monitor.

On the other hand, aural signals from the speech input section 103 are coded by the aural signal coding-decoding section 108. The coded speech information is multiplexed by the signal multiplexing section 110 with data such as the image information coded by the video signal coding-decoding section 107. The multiplexed information is transmitted on a line to the communication network 1100 by the communication network transmitting-receiving section 111.

Next, reception of information from an associated video conference system for processing will be described.

First, information such as an image and speech transferred through the communication network 1100 from the associated party is received by the communication network transmitting-receiving section 111 over the line and sent to the signal multiplexing section 110 which then separates the information into image information and speech information. The resultant image information is decoded by the video signal coding-decoding section 107, and characters and graphics are overlaid on the decoded image information by the character and graphics display section 106, then the result is displayed by the image display section 102 through the split display processing section 124.

On the other hand, the speech information output from the signal multiplexing section 110 is decoded by the aural signal coding-decoding section 108 for outputting as speech of the associated party through the speech output section 104.

At the beginning and ending of the video conference as well as in session, the video conference system control section 109 controls the functions in response to information entered through the keying section 105. The information processing section 112 processes various pieces of information in the video conference system. The information processed by the information processing section 112 can be stored in the information storage section 113. Screen images output from the character and graphics display section 106 can be printed on the video printer 1001, and can also be recorded by the video tape recorder 1002 together with the speeches decoded by the aural signal coding- decoding section 108.

The video conference system according to the embodiment of the invention accepts and manages reservation of video conferences and starts the sections of the video conference system and builds up communication in response to the reservation contents.

Video conference reservation will be described in detail.

Figure 2:
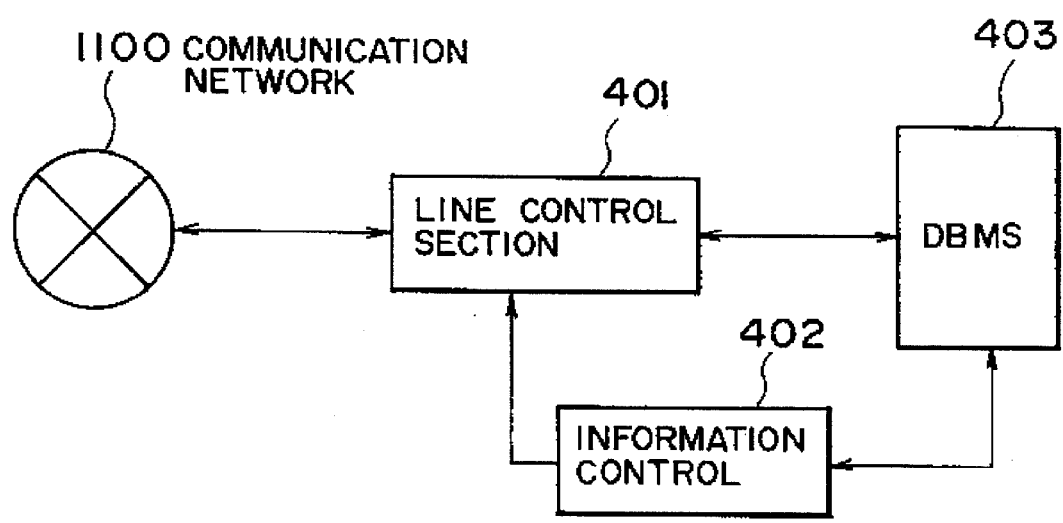
FIG. 2 is a block diagram showing the configuration of an information center.

First, FIG. 2 shows the configuration of the information center 1130, wherein numeral 401 is a line control section, numeral 402 is an information control section, and numeral 403 is a DBMS (data base management system). The DBMS 403 manages how video conferences are reserved, what schedule the conference participants have, and a data base storing their telephone directory information, and retrieves, registers, changes, deletes, etc., various data entries. The information control section 402 performs control according to the information in the DBMS 403. The line control section 401 controls transmission and reception of information through the communication network.

The user checks what schedule the conference participants have and how the video conference system of the associated party is reserved, then reserves a video conference.

Figure 5:
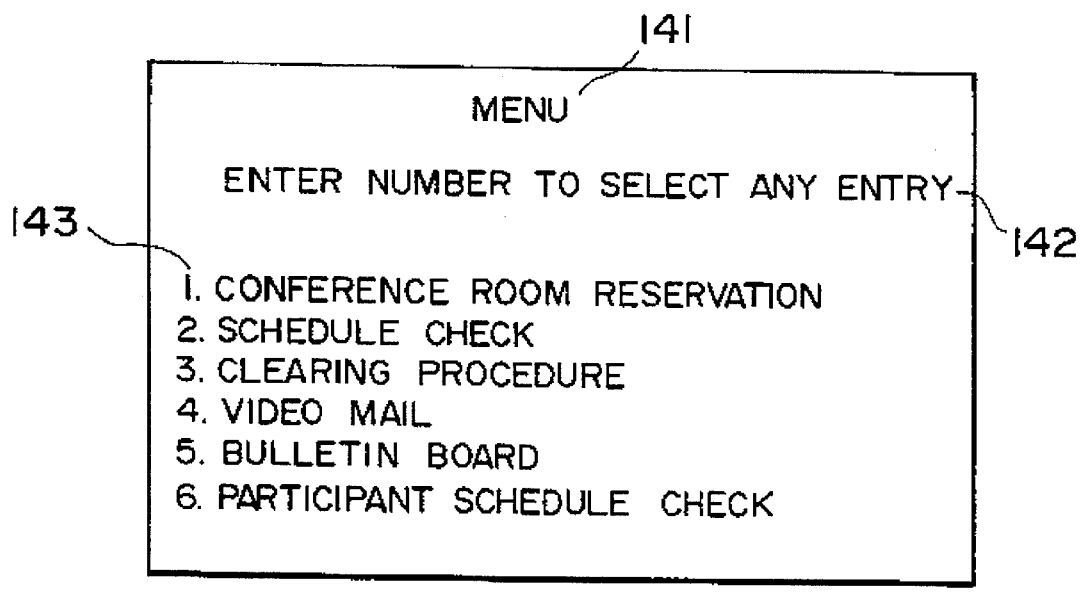
FIG. 5 shows a top menu displayed by the video conference system.

In operation, when the user enters a menu display command through the keying section 105, the video conference system control section 109 controls the character and graphics display section 106 to display a menu screen for conference room reservation shown in FIG. 5 on the image display section 102 in FIG. 5, numeral 141 is a title, numeral 142 is a comment, numeral 143 is entry numbers, and numeral 144 is entries. On the menu screen in FIG. 5, the user can select a desired menu entry by entering its corresponding number. Digits of dial buttons on the keying section 105 are entered. The entry numbers correspond to the dial button digits.

If the user selects 6. PARTICIPANT SCHEDULE CHECK on the menu in FIG. 5, the video conference system control section 109 judges that PARTICIPANT SCHEDULE CHECK has been selected, and displays the screen shown in FIG. 6.

Figure 6:
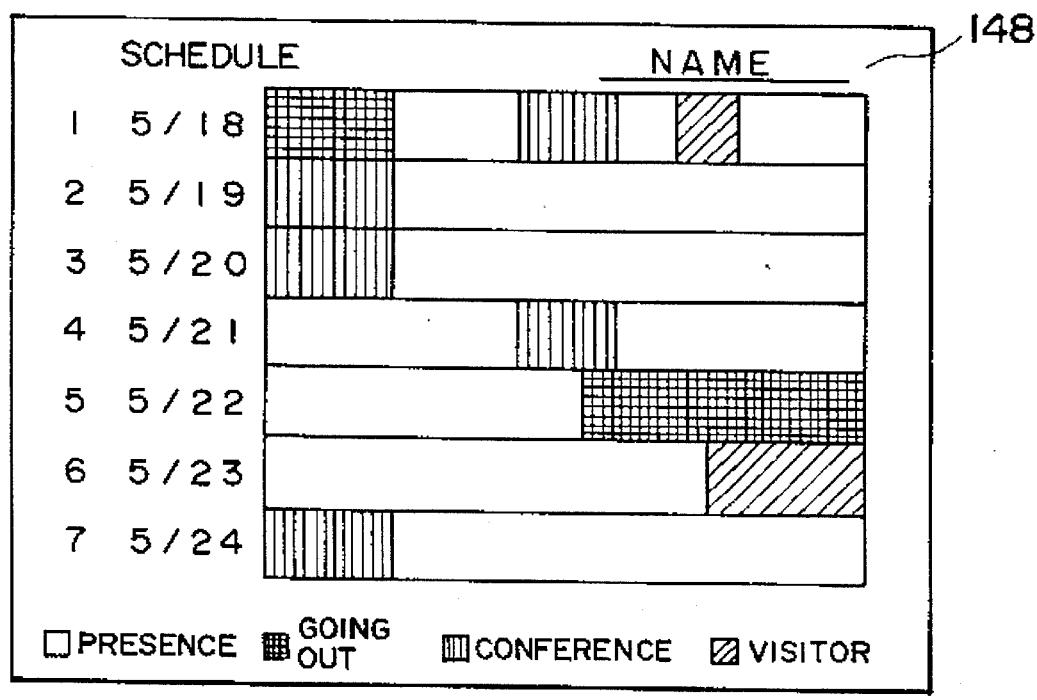
FIG. 6 shows a participant schedule check menu displayed by the video conference system.

FIG. 6 is a screen for the user to check the schedule o the conference participants for schedule.

In the figure, numeral 148 is a name entry area in which the user enters the name or identification number of the person whose schedule is to be checked. When the user enters the name in the name entry area 148, the video conference system control section 109 controls the communication network control section 111 to inquire about the person's schedule for one week from the present day of the information center 1130.

When receiving the inquiry through the line control section 401, the information control section 402 at the information center 1130 controls the DBMS 403 to get answer information and returns it to the inquiring video conference system through the line control section 401.

When receiving the answer information from the information center 1130, the video conference system control section 109 temporarily stores the information and also displays it in the format shown in FIG. 6.

Next, when the user selects a date by entering its corresponding entry number on the screen in FIG. 6, the person's schedule on the selected day is displayed in the format shown in FIG. 7. When the user further selects a specific entry by entering its corresponding entry number on the screen shown in FIG. 7, detailed information on the selected entry is displayed in the format shown in FIG. 8, for example. FIG. 8 shows display of detailed information on the entry "CONFERENCE." The person who registered the schedule can set a password so as to inhibit other persons from accessing its information unless the password is entered.

When the user selects 2. SCHEDULE CHECK on the menu in FIG. 5, the video conference system control section 109 judges that SCHEDULE CHECK has been selected.

Then, the video conference system control section 109 accepts specification of the associated video conference system with which a video conference is to be held on a screen similar to that in FIG. 6, and inquires of the information center 1130 through the communication network control section 111 how the video conference system is reserved.

When receiving the inquiry through the line control section 401, the information control section 402 at the information center 1130 controls the DBMS 403 to get answer information and returns it to the inquiring video conference system through the line control section 401.

When receiving the answer information from the information center 1130, the video conference system control section 109 temporarily stores the information and also displays it in sequence as with the participant schedule shown in FIGS. 6 to 8.

Next, when the user selects 1. CONFERENCE ROOM RESERVATION on the menu in FIG. 5, the video conference system control section 109 judges that CONFERENCE RESERVATION has been selected, and displays the screen shown in FIG. 9.

FIG. 9 is a screen for the user to select the conference type.

When the user selects 2. VIDEO CONFERENCE on the screen in FIG. 9, the video conference system control section 109 displays the screen shown in FIG. 10.

FIG. 10 is a screen for the user to select the associated party for the video conference.

On the screen in FIG. 10, the user can select the associated party by entering its corresponding number. Assume that 2. BRANCH A is a selected. When 2 is entered, the video conference system control section 109 displays the screen in FIG. 11.

FIG. 11 is a screen for accepting specification of the conference date, wherein numeral 145 is a display for accepting specification of AM or PM. The user specifies the entries by handling the dial buttons. Upon completion of the entry operation, the video conference system control section 109 displays the screen in FIG. 12 which shows an example where May 28 is specified as the conference date on the screen in FIG. 11.

FIG. 12 is a screen to accept setting of the start time and end time of the conference, wherein numeral 146 is digits indicating the hours and minutes. The user sets the start time and end time by handling the dial buttons, and the control section 109 accepts and displays them accordingly. Upon completion of acceptance of setting the end time, the video conference system control section 109 displays the screen shown in FIG. 13.

Figures 13, 14:
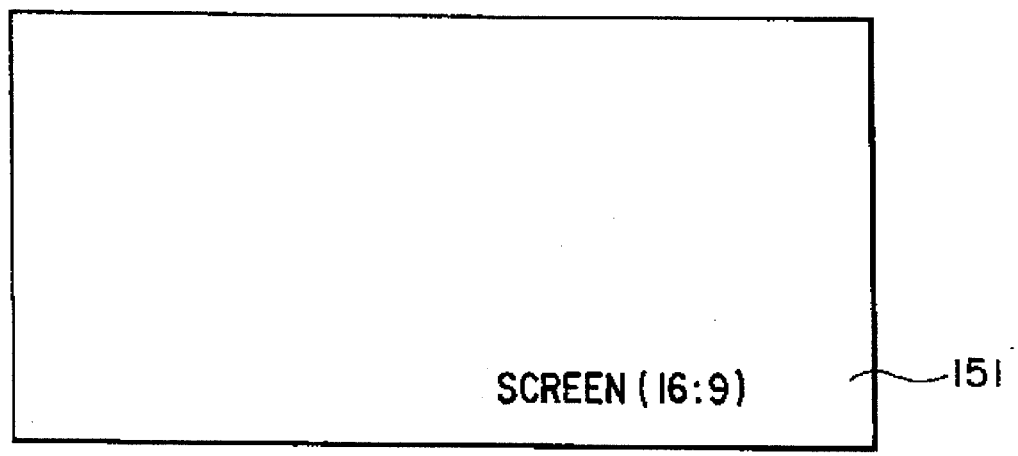
FIG. 13 shows a screen for specifying registration of setting displayed by the video conference system.
FIG. 14 shows an image display form of the video conference system.

FIG. 13 is a screen for accepting an instruction of registration of the setting, wherein numeral 147 is a guide line for command entry such as the setting end. If the user presses the # key, the video conference system control section 109 judges that the conference reservation sequence is complete. As shown in a of FIG. 3 (A), the video conference system control section 109 in the video conference system A completing the conference reservation sequence stores the reservation contents made so far in the information storage section 113 and also sends them to the information center 1130 and requests the information center 1130 to register the reservation contents.

Figure 3A:
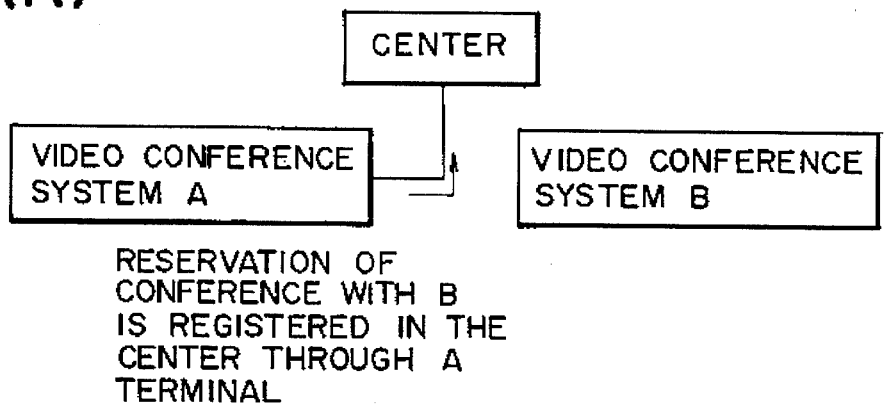
FIGS. 3(A) to 3(D) each show a video conference system reservation operation.
Figure 3B:
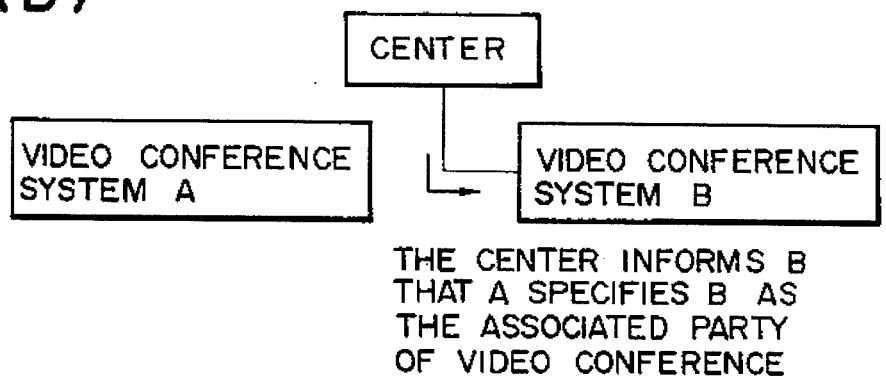

When receiving the request through the line control section 401, the information control section 402 at the information center 1130 registers the reservation contents in the DBMS 403 and also transfers local reservation in the registration contents to the video conference system B specified as the associated party. The video conference system control section 109 in the video conference system B stores the received registration contents in the information storage section 113 for management, as shown in FIG. 3(B).

Figure 3C:
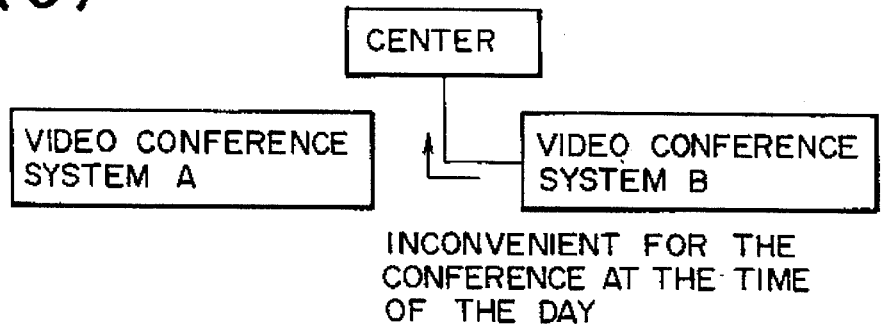
Figure 3D:
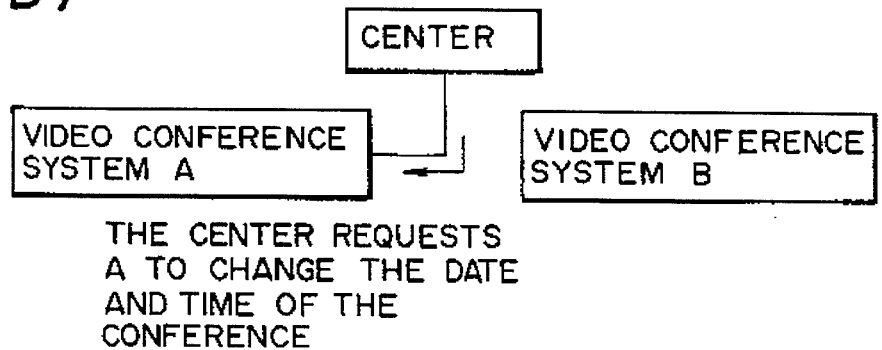

Then, if the video conference system B informs the information center 1130 of any objection to the schedule, as shown in FIG. 3(C), the information center 1130 sends a request for changing the conference schedule to the video conference system A, as shown in FIG. 3(D).

When the video conference schedule is set in the video conference system A, expected participants in the conference may also be set and then registered in the information center 1130.

Figure 4A:
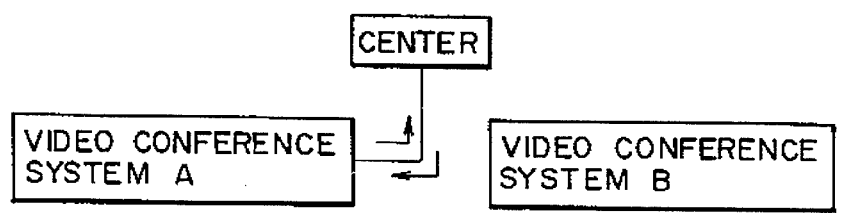
FIG. 4(A) and 4(B) each show the video conference system reservation operation.
Figure 4B:
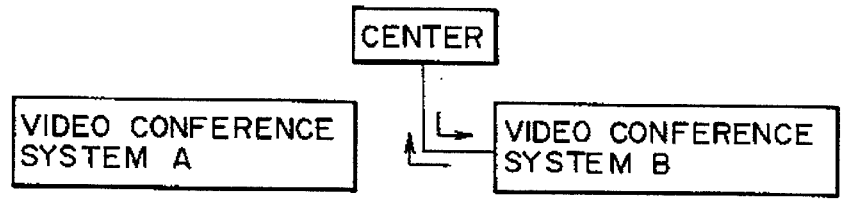

In this case, the information control section 402 at the information center 1130 sends information on the expected participants in the conference in the video conference system B and the reserved video conference to the video conference system B, as shown in FIG. 4(A). The video conference system B acknowledges the information and if someone finds it inconvenient to attend the conference, they register their deputy in the information center 1130, as shown in FIG. 4(B).

Registration of each person's schedule in the information center may be made by any desired method.

The video conference system control section 109 of the video conference system A which has registered reservation of the video conference in the information center then checks the conference date and time stored in the information storage section 113 periodically and references a built-in clock. When the conference date and time is reached, the video conference system control section 113 controls the power unit 1000 to start the sections of the video conference system and references the telephone directory information stored in the information storage section 113 to find the telephone numbers of the associated parties. The associated parties are then called on the found telephone numbers. Or if a call is instructed through the keying section 105, the telephone directory information stored in the information storage section 113 is referenced to find the telephone numbers of the associated parties. In this case too, the associated parties are called on the found telephone numbers.

On the other hand, before the conference date and time, the video conference system B reserved for the conference through the information center controls the power unit 1000 to start the sections of the video conference system B and waits to be called.

The video conference system according to the embodiment splits the screen of the image display section 102 using the split display processing section 124, as shown in FIGS. 14 to 17.

First, FIG. 14 shows use of the full screen of the image display section 102 as one wide screen with an aspect ratio of 16 to 9.

Figure 15:
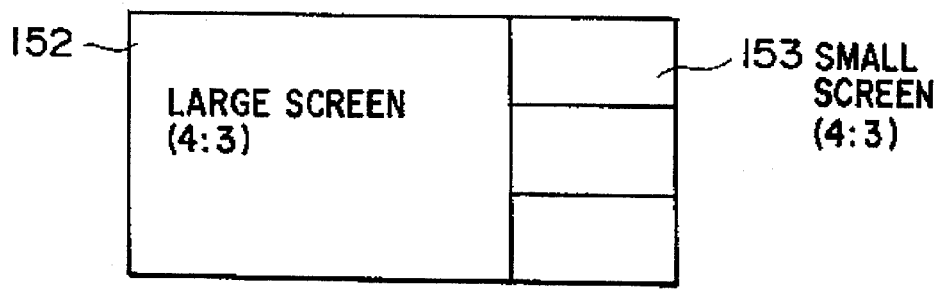
FIG. 15 shows another image display form of the video conference system.
Figure 16:
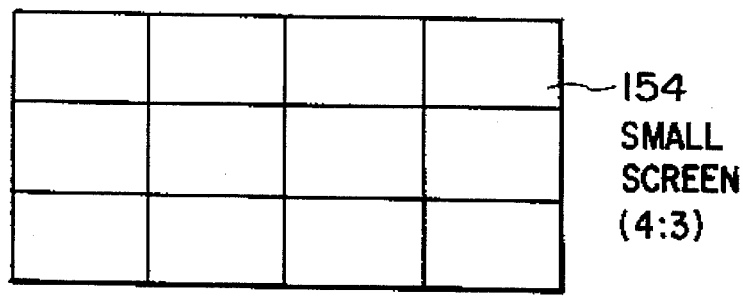
FIG. 16 shows a further image display form of the video conference system.
Figure 17:
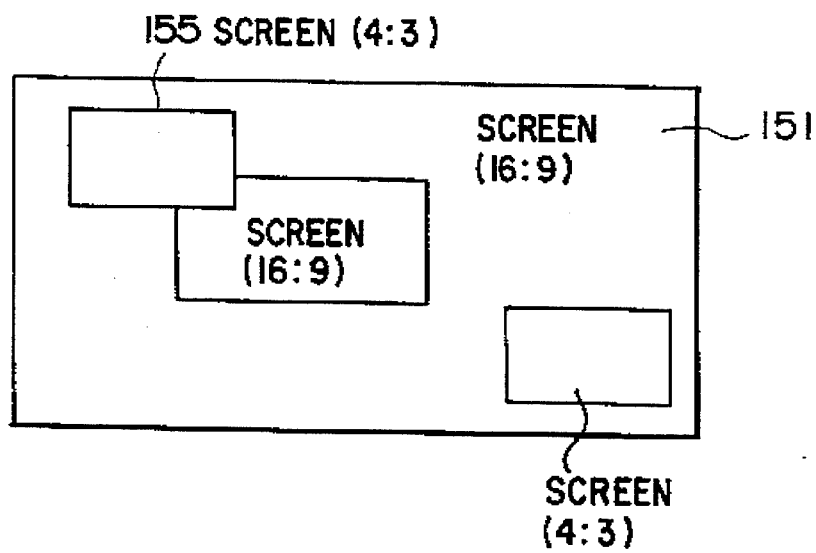
FIG. 17 shows another image display form of the video conference system.

Next, FIGS. 15 to 17 show splitting the screen of an aspect ratio of 16 to 9 into screens with an aspect ratio of 4 to 3 used in combination for display.

FIG. 15 shows splitting the screen with an aspect ratio 16 to 9 into a large screen with an aspect ratio of 4 to 3 and three small screens with an aspect ratio of 4 to 3 for display. The 1-side length ratio of the large to small screens is 3 to 1. FIG. 16 shows splitting the screen with an aspect ratio of 16 to 9 into a maximum of 12 small screens with an aspect ratio of 4 to 3 for display.

Next, FIG. 17 shows display of a plurality of screens with an aspect ratio of 4 to 3 or 16 to 9 on the screen in the window form.

In addition to home images picked up through the video input section 101 and images from the associated party received at the communication network transmitting-receiving section 111, images input from external machines such as a computer and the video tape recorder 1002 connected to the video conference system are displayed according to the purpose. The forms in FIGS. 14 to 17 can be changed according to the purpose at any time during the conference.

The screen split display operation shown in FIGS. 14 to 17 will be described.

Figure 18:
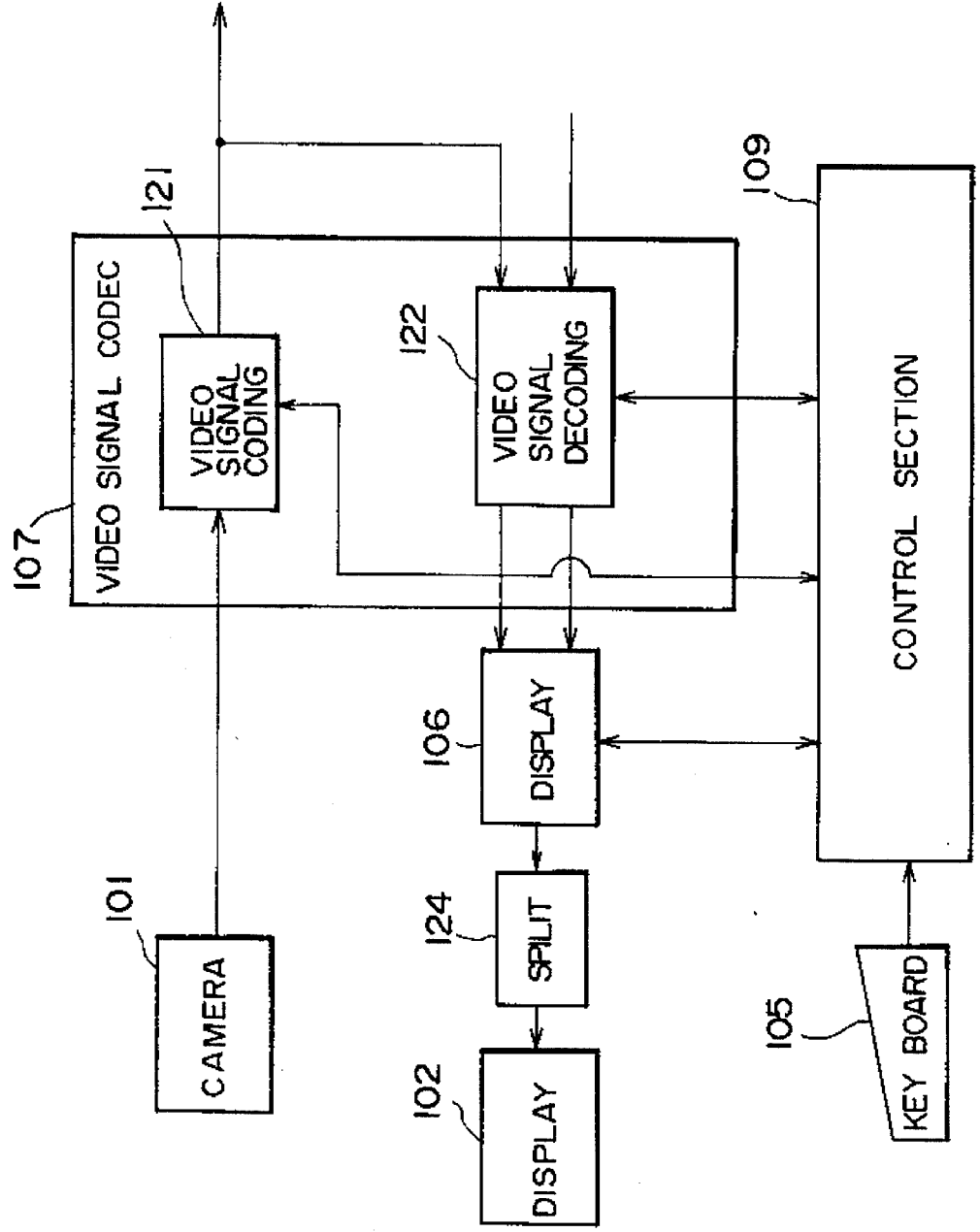
FIG. 18 is a block diagram of an image processing system in the video conference system.

FIG. 18 shows the image function portion extracted from the block diagram of the video conference system, wherein numeral 101 is the video input section, numeral 102 is the image display section, numeral 105 is the keying section, numeral 109 is the video conference system control section, numeral 106 is the character and graphics display section, numeral 107 is the video signal coding-decoding section, and numeral 124 is the split display processing section. The video signal coding-decoding processing section 107 has a video signal coding section 121 and a video signal decoding section 122.

During a conference, a video signal from the video input section 101 is sent to the video signal coding section 121. Coded information is processed for communication and is transmitted to the associated party, and some of the information is decoded by the video signal decoding section 122 and sent via the character and graphics display section 106 to the split display processing section 124.

Image information from the associated party is decoded by the video signal decoding section 122 and sent via the character and graphics display section 106 to the split display processing section 124.

The split display processing section 124 combines the video signals through the character and graphics display section 106 and video signals from an external machine in response to control information from the video conference system control section 109, and displays characters, graphics and an image on the image display section 102. In response to information entered through the keying section 105, the video conference system control section 109 causes the character and graphics display section 106 to overlay characters and graphics on the image from the video signal decoding section 122, and gives control information to the sections of the video control system. Also, in response to information entered through the keying section 105, the video conference system control section 109 gives to the split display processing section 124, control information specifying which form in FIGS. 14–17 is to be used for display and what image is to be displayed on each screen division.

Display made by the split display processing section 124 on screens into which the full screen is split will be described by taking display in the form shown in FIG. 15 as an example.

Figure 19:
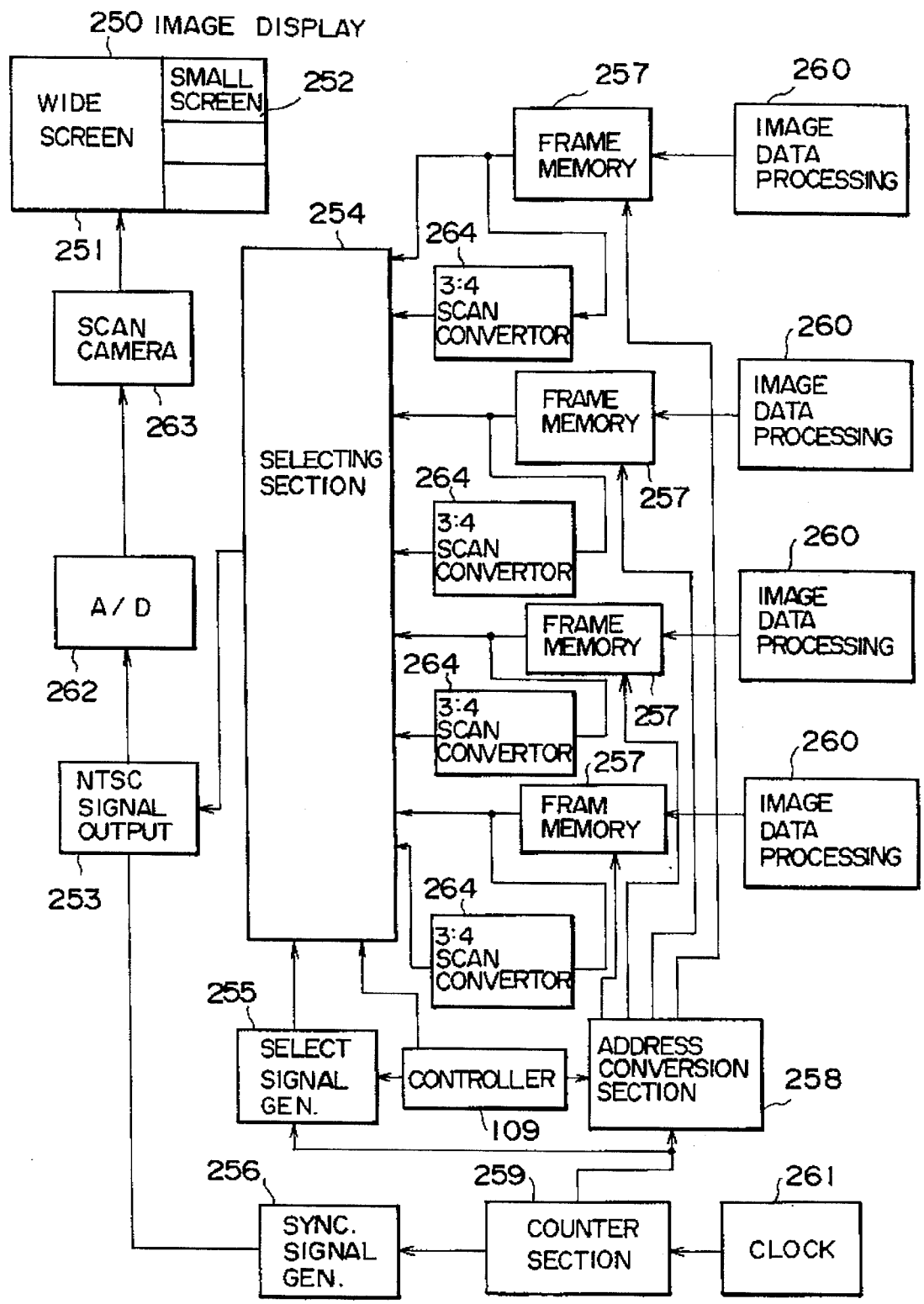
FIG. 19 is a block diagram showing the configuration of a split display processing section.

FIG. 19 shows the configuration of the split display processing section 124, wherein numeral 250 is an image display section which has a screen with an aspect ratio of 16 to 9 and displays an image in a scanning line system, numeral 253 is an NTSC (National Television System Committee) signal output section, numeral 254 is a selector section, numeral 255 is a select signal generation section, numeral 256 is an NTSC signal synchronizing signal generation section, numeral 257 is frame memories, numeral 258 is an address conversion section, numeral 259 is a counter section, numeral 260 is image data processing sections, numeral 261 is a clock signal oscillation section, numeral 262 is an A/D conversion section, numeral 263 is a scan converter, and numeral 264 is 3:4 scan converters. The NTSC is a video signal of the screen size with an aspect ratio of 4 to 3.

Numeral 251 represents a wide screen of an aspect ratio 16 to 9 and numeral 252 represents a small screen of an aspect ratio of 4 to 3. Numeral 109 is the video conference system control section.

Video signals from the character and graphics display section 106 and external machines are input to the image data processing sections 260. If video signals input from the external machines are analog video signals, the image data processing sections 260 which input the analog video signals are provided with a A/D converter which converts the analog video signals into digital signals. The video signals from the image data processing sections 260 are stored in the frame memories 257 for each frame. Clock signals of the clock signal oscillation section 261 are counted by the counter section 259. According to control information from the video conference system control section 109, the address conversion section 258 generates address data in response to the count value of the counter section 259, and feeds the address data into the frame memories 257. The address data is generated for video signals displayed on a small screen so that the screen is reduced to ¼. The address data given to each of the frame memories 257 is generated at the timing such that the video signal read from the frame memory is displayed at a predetermined position of each separate screen shown in FIG. 15. The video signals read from the frame memories 257 are sent to the selector section 254 according to the address data from the address conversion section 258, and are also input to the 3:4 scan converter 264 which then carries out (4/16):(3/9) or 3:4 conversion of the video signals so as to set a screen with an aspect ratio of 4:3 after conversion to an aspect ratio of 16:9 by the scan converter 263 at screen display. Information after the 3:4 conversion is executed is also sent to the selector section 254.

The selector section 254 selects the video signals stored in the frame memories 257 or the data output by the 3:4 scan converter 264 in response to a select signal generated by the select signal generation section 255. For display in the form shown in FIG. 15, the data output by the 3:4 scan converter 264 is selected. According to control information from the video conference system control section 109, the select signal generation section 255 generates a select signal in response to the count value of the counter section 259 so that the video signal selected by the selector section 254 is changed at the position to make a split screen display as shown in FIG. 15, on a display scanning line of the image display section 250. The image information selected by the selector section is sent to the NTSC signal output section 253.

On the other hand, the NTSC signal synchronizing signal generation section 256 generates an NTSC signal synchronizing signal from a count signal from the counter section 259 and sends the synchronizing signal to the NTSC signal output section 253 which then generates a digital NTSC signal from the input video signal and NTSC synchronizing signal. The digital NTSC signal is converted into an analog video signal by the A/D converter section 262 and further converted from a screen with an aspect ratio 4:3 into a wide screen with an aspect ratio 16:9 by the scan converter 263 for display on the image display section 250. The reason why conversion to the wide screen is made at the display stage is that generally an image is handled at a size of aspect ratio 4:3 in video telephone and video conference systems.

Lastly, the structure of the video conference system according to the embodiment will be described.

Figure 20:
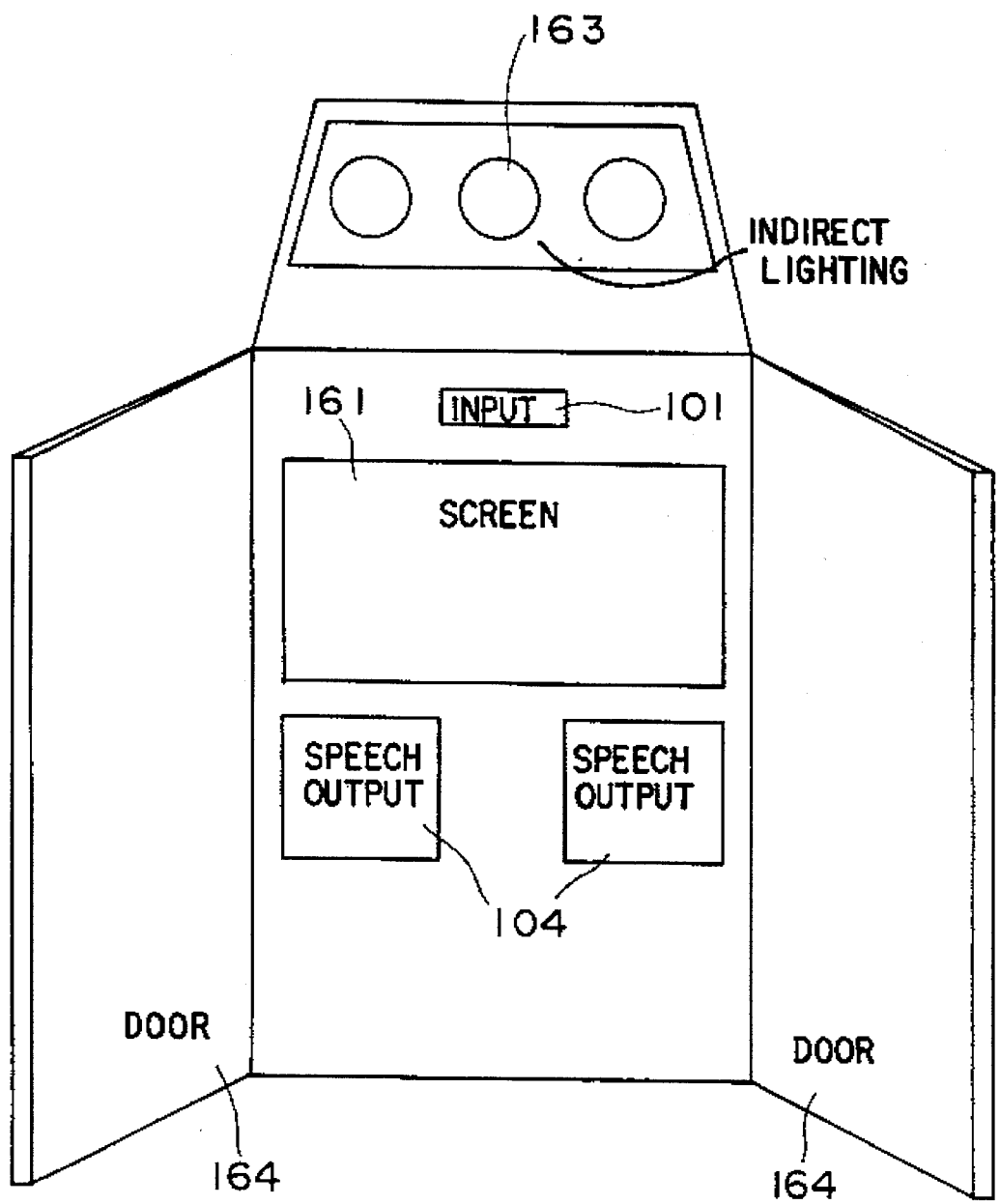
FIG. 20 shows an external view of the video conference system.
Figure 22:
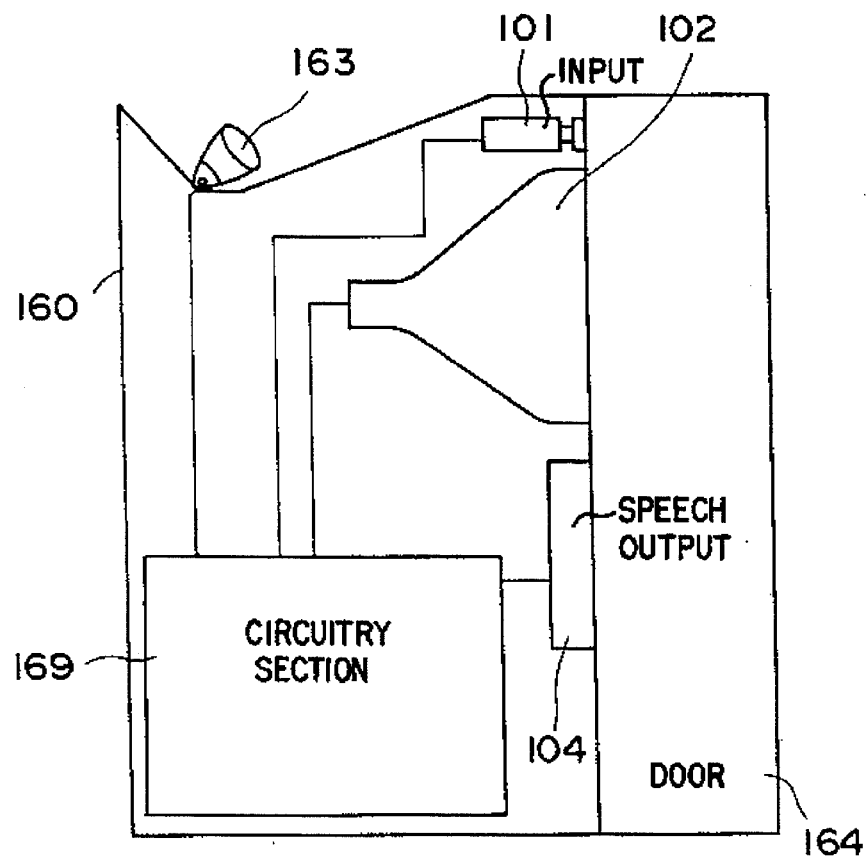
FIG. 22 shows the internal structure of the video conference system.

FIGS. 20 and 22 show an external view and an internal structure of the video conference system according to the invention, wherein numeral 160 is a cabinet, numeral 161 is a screen, numeral 101 is the video input section or camera, numeral 163 is the indirect lighting apparatus of a ceiling reflection system whose radiation elevation angle to the ceiling can be adjusted from 0 to 90 degrees, numeral 164 is a double-leafed hinged door, and numeral 104 is the speech output section or loudspeakers. Other sections of the video conference system are housed in a circuitry section 169 in the cabinet 160.

Figure 21:
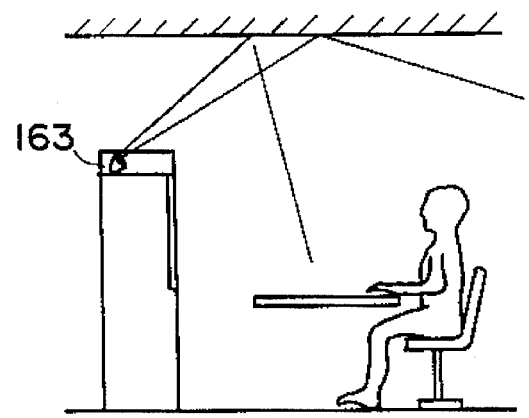
FIG. 21 shows how the lighting apparatus of the video conference system is used.

In the video conference system, the screen 161 is positioned above a conference table, thereby preventing the conference participants from looking downward, thereby enabling their eyes to be directed more in the direction of the camera 101. As shown in FIG. 21, the lighting apparatus 163 is capable of indirect lighting with ceiling reflection to provide proper lightness and a natural atmosphere and transmit subtle facial expressions of the conference participants accurately. Since the lighting apparatus 163 is adapted to radiate light in the forward and upward direction, as shown in FIG. 22, if a CRT is used for the image output section, the lighting apparatus can be housed in the narrow part on the top of the CRT tube behind the screen. If a projector is used as the image output section, the lighting apparatus can be housed on the upper portion of the optical path behind the screen. Thus, even if the lighting apparatus is installed, the video conference system can be made compact.

Figure 23:
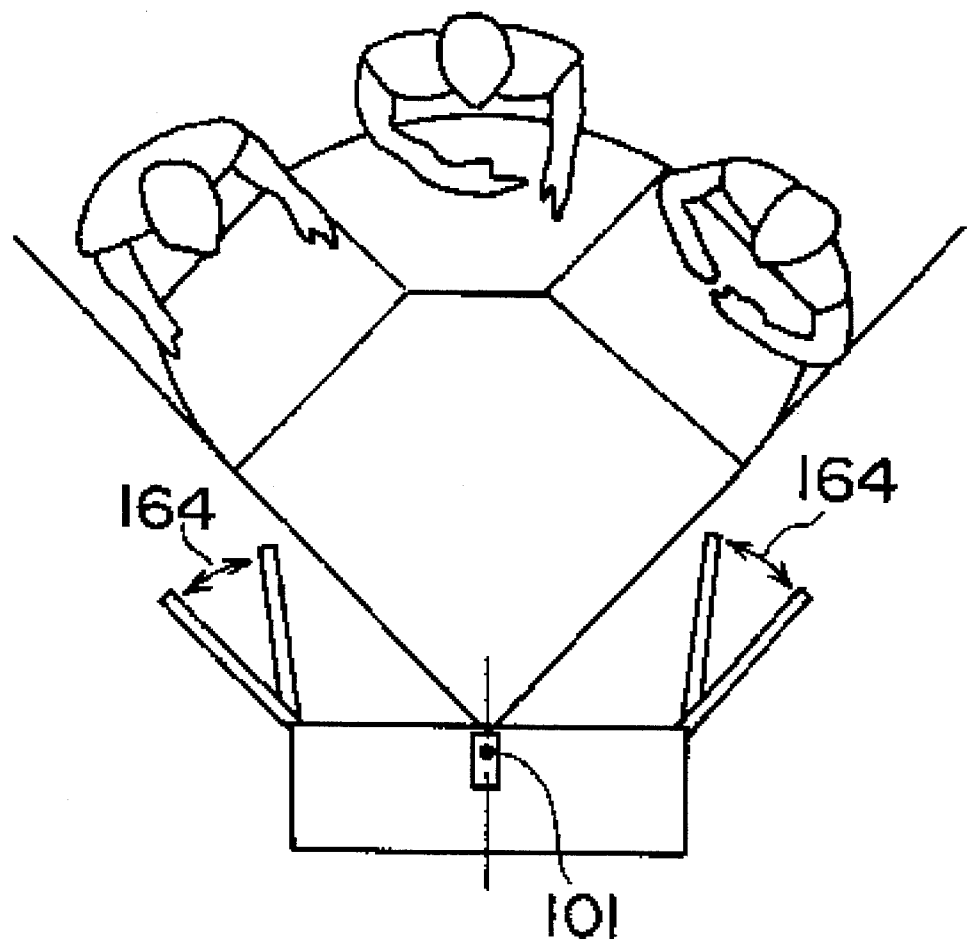
FIG. 23 shows how a camera and double-leaf door are used in the video conference system.

As shown in FIG. 23, the camera pick-up range can be limited by changing the open angle of the double-leafed door 164. When the camera is panned, something irrelevant to that part of the conference or something which should not be appeared on TV screen, the camera can be placed out of camera shot.

Preferably, the open angle of the double-leafed door 164 in conference is about the view angle of the camera when the camera is directed to the front.

The speech system made up of the speech input section 103, the aural signal coding-decoding section 108, the speech output section (loudspeakers) 104, etc., is made stereo and a speech from the associated party is generated from a position near the speaker position on the screen, enabling voice to be heard from the participant appearing on the screen.

As described above, according to the invention, there is provided a video conference system which supports setting of reservation of the system and can control operation in response to the setup reservation contents. There is also provided a video conference system which enables a good video conference without giving special consideration to a conference room or facilities.

What is claimed is:

1. A video conference system comprising:

first video input means for outputting a first video signal;

second video input means for outputting a second video signal;

means for coding the first video signal outputted by said first video input means into a coded first video signal;

speech input means for outputting an aural signal;

means for coding the aural signal outputted by said speech input means into a coded aural signal;

means for multiplexing the coded aural signal and the coded first video signal into a multiplexed coded aural and first video signal for transmission to a communication network;

means for receiving the multiplexed coded aural and first video signal through the communication network and demultiplexing the multiplexed coded aural and first video signal into a demultiplexed coded aural signal and a demultiplexed coded first video signal;

means for decoding the demultiplexed coded first video signal and the coded first video signal coded by said means for coding;

means for decoding the demultiplexed coded aural signal into a decoded aural signal;

means for outputting speech represented by the decoded aural signal;

display means having a display screen with an aspect ratio of 16 to 9 for displaying an image;

operation reception means for receiving operations from an operator; and split display means including:

means for selectively, depending upon the operation received by said operation reception means, setting a wide screen mode in which an image with an aspect ratio of 16 to 9 is displayed on said display screen, or setting a split screens mode in which at least two images with an aspect ratio of 4 to 3 are displayed on said display screen in a predetermined size or sizes;

first scan converters to which said decoded video signals and the second video signal outputted by said second video input means are assigned as assigned video signals of the first scan converters, respectively, each of said first scan converters converting the assigned video signals assigned thereto with a conversion ratio of $4/16:3/9$ (horizontal:vertical), and a size of the image represented by the assigned video signals is reduced accordingly to a rate of said predetermined size or sizes to a size of said display screen;

selecting means for selecting, depending upon the operation received by said operation reception means, and outputting, one of the decoded video signals as an output video signal when said wide screen mode is set, wherein said selecting means selects, depending upon the operation received by said operation reception means, and combines at least two of the assigned video signals which are converted by said first scan converters and outputs, as the output video signal, the video signal in which the assigned video signals selected are combined when said split screens mode is set; and a second scan converter for converting in a manner of converting an aspect ratio of 4 to 3 into an aspect ratio of 16 to 9 said output video signal outputted by said selecting means so that the image represented by said output video signal changes into an image having an aspect ratio of 16 to 9, and displays an image represented by the output video signal converted by said second scan converter on said display screen of said display means, each of said decoded video signals and the output video signal outputted by said selecting means representing an image having an aspect ratio of 4 to 3.

* * * * *